United States Patent [19]

Pearlman

[11] 4,423,418
[45] Dec. 27, 1983

[54] SIMULATOR OF MULTIPLE ELECTROMAGNETIC SIGNAL SOURCES SUCH AS IN A RADAR SIGNAL FIELD

[75] Inventor: Lester S. Pearlman, Sunnyvale, Calif.
[73] Assignee: Itek Corporation, Sunnyvale, Calif.
[21] Appl. No.: 274,862
[22] Filed: Jun. 18, 1981
[51] Int. Cl.³ .............................................. G01S 7/40
[52] U.S. Cl. ....................................... 343/17.7; 434/2; 455/226
[58] Field of Search .................... 343/17.7; 434/2; 455/226, 67, 165, 266; 364/485

[56] References Cited

U.S. PATENT DOCUMENTS

| | | | |
|---|---|---|---|
| 3,719,812 | 3/1973 | Bishop et al. | 364/579 |
| 3,792,475 | 2/1974 | Smetana | 343/17.7 |
| 3,838,201 | 9/1974 | Appling | 434/2 |
| 4,017,985 | 4/1977 | Heartz | 434/2 |
| 4,081,752 | 3/1978 | Sumi | 455/165 |
| 4,138,645 | 2/1979 | Parato | 455/226 |
| 4,192,082 | 3/1980 | Deaton | 434/2 |
| 4,204,342 | 5/1980 | Linfield | 434/2 |
| 4,261,055 | 4/1981 | Farina | 455/165 |
| 4,272,730 | 6/1981 | Digiovanni | 331/16 |

Primary Examiner—S. C. Buczinski
Assistant Examiner—M. R. Gordon
Attorney, Agent, or Firm—Gerald P. Parsons; Roy L. Brown

[57] ABSTRACT

A technique for simulating various signals, such as from radar emitters, in a broad frequency spectrum by generating at any given instant only those of the signals that affect a receiver which is tuned to a particular bandwidth. As the receiver is tuned to a new bandwidth, the simulating system responds by quickly generating any signal or signals that exist in the new bandwidth.

13 Claims, 2 Drawing Figures

SIMULATOR OF MULTIPLE ELECTROMAGNETIC SIGNAL SOURCES SUCH AS IN A RADAR SIGNAL FIELD

BACKGROUND OF INVENTION

This invention is related generally to the art of simulating an environment of electromagnetic signals for the purpose of testing or training on a receiver, and more particularly relates to the simulation of a field of radar signals for the purpose of testing, training and simulating an emitter library on a radar warning receiver.

A commonly used radar warning receiver includes a down converter connecting its antennas to an intermediate frequency superheterodyne receiver. The receiver is scanned across a frequency range of interest either manually or by an electronic scanning system. Detected signals at the output of the receiver are applied to video sections for conversion, processing and display. The type, direction and other characteristics of each radar emitter having a frequency within the scanned range is displayed.

In order to test such systems, and also to train operators on them, systems and techniques have been developed for simulating a field of radar signals which are applied to the receiver. A complete simulation is complex, primarily because of the many variations between different types of radar emitters. Some emit periodic pulses of radio frequency energy, some random pulses and others operate on a continuous wave. Pulse type emitters vary as to the width of the pulse, the interval of pulse recurrence and scheduled changes in this interval. Others even vary in frequency of their emitted signal. Most utilize a scanning antenna, thus requiring the simulation of gain patterns of the emitter and scan rates. Gain patterns for the receiver antennas also need to be simulated. And if the emitter and/or receiver are in vehicles, such as boats or airplanes, which are moving, the relative aspect and changing location need to be simulated as well.

One technique used for simulation is to generate with a separate oscillator and modulator each of the radar emitters to be simulated in a given radar field. This brute-force approach does provide all of the desired signals. But a significant disadvantage is the very large amount of electronic equipment that is required in order to simulate a realistic number of emitters, and the technical problems of combining them.

Another approach that has been suggested to limit the amount of hardware required is to use a lesser number of oscillators and time share them by rapidly switching their frequency and the character of modulation in a manner to appear to simultaneously generate each of the radar signals over a frequency range of interest. A significant disadvantage of this technique is that the repetition rate of pulses sought to be simulated from a given emitter is limited. If a large number of signals are sought to be simulated, the repetition rate of any one signal has to be very low. Also, this technique cannot simulate a continuous wave signal and cannot simulate two pulses from different emitters at the same instant in time. Even with these limitations, however, this technique has enjoyed wide popularity. Each of the aforementioned techniques apply the signals to the radio frequency portion of the receiver.

A third technique is to simulate the signals in a manner that they may be inserted in the digital and video section of the receiver, bypassing the tuner. This has the disadvantage that it tests only a portion of the receiver; it provides only simplified, partial simulation and an operator of the receiver for training purposes does not have an opportunity to operate the tuning portions of it. It is not a real life simulation.

Therefore, it is a primary object of the present invention to provide a technique and system for generating a plurality of signals at different frequencies over a given frequency range, without the limitations of other techniques discussed above, in a real life simulation of an environment of electromagnetic signals and a realistic verification of an emitter library.

SUMMARY OF INVENTION

This and additional objectives are accomplished by the present invention wherein, briefly, only those signals of the spectrum are generated at any given time that fall within a frequency window closely surrounding the bandwidth to which the receiver is tuned at that instant. The characteristics of all signals within the frequency range are stored in the system but only those that effect the receiver at any particular instant are generated. The signals are inserted into the receiver at at location in advance of its tuner so that the simulation is more complete in that the tuning section is included. Since most receivers take a significant finite time to tune to a new bandwidth, a command to the receiver to tune to a new bandwidth is detected and the characteristics of the new signals within a frequency window closely surrounding that bandwidth can be generated and applied to the receiver in an amount of time less than the time it takes the tuner to change to the new frequency. Thus, as the receiver is tuned across its full frequency range, the simulated radar signals are detected as if the entire number of signals in the field are being generated and applied to the receiver at one time. However, only those of the radar signals that affect the receiver when tuned to a particular bandwidth and center frequency are in fact being generated. Although these techniques have a particular applicability to simulating a number of radar emitters for the purpose of verification of an emitter library and training personnel on a radar warning receiver, the techniques are also of general applicability for other testing, simulation and training purposes.

Additional objections, advantages and features of the present invention are include in the following description of preferred embodiment thereof, which description should be read in conjunction with the accompanying drawings.

DESCRIPTION OF A PREFERRED EMBODIMENT

Figure 1:
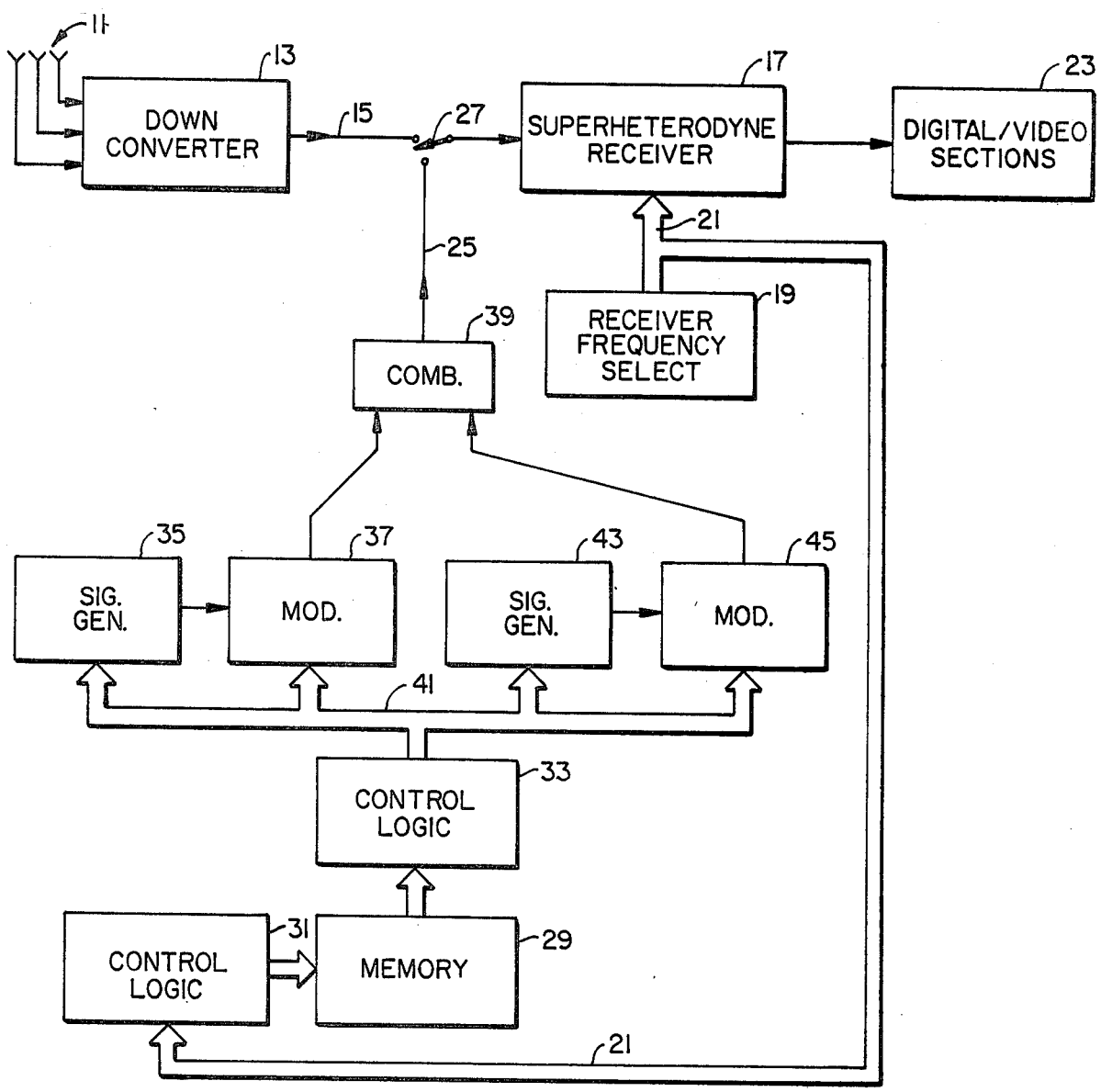
FIG. 1 shows in block diagram form a receiver and system for applying simulated sigals to it.

Referring initially to FIG. 1, the main portions of an ordinary receiver, such as a radar warning receiver, are explained. One or more antennas 11 are connected to a front end radio frequency section 13. In a radar warning receiver, these antennas will be positioned to point in different directions. In the receiver test, signal amplitudes will be controlled to simulate the receiver antenna pattern of each selected antenna or antennas. An intermediate frequency signal (baseband) then results in its output circuit 13 which is applied to a superheterodyne receiver 17 which includes the tuner. The bandwidth and center frequency to which the tuner is set is controlled by a digital circuit 19 through a signal in a circuit 21 that designates the center frequency and the bandwidth to which the receiver is to be tuned. The detected radio frequency signals within the bandwidth of the tuner are then applied to final processing and display circuits 23. In the case of a radar warning receiver, the characteristics of radar emitters having a frequency within the tuned bandwidth of the receiver 17 are indicated and displayed by the circuits 23.

One implementation of the present invention contemplates applying simulated signals through a circuit 25 to an input of the receiver 17. A switching circuit 27 allows selection of signals from the real world or from the simulator. The simulated signals could, alternatively, be inserted at the input of the front end RF sections 13 but it is easier to do at the location shown in FIG. 1 since the frequency range of interest has been compressed at the input to the receiver 17 into an intermediate frequency range, requiring less equipment. For receivers of the type that do not first convert to an intermediate frequency range, the simulated signals would have to be put in at the antenna terminals. Since it is desired for the tuner to be included for the path of the simulated signals, they must be applied to the receiver at some convenient location in advance of the tuner.

The circuit that generates the simulated signals will now be described. A digital memory 29 is given a record of the characteristic of each signal in a full frequency range of the receiver that is to be simulated. A clocked additional modulation source is based upon the scenario and provides amplitude modulation simulating emitter relative location, antenna patterns, scan and receiving antenna pattern and aspect. Input control logic 31 is responsive to the bandwidth and center frequency to which the receiver 17 is to be tuned as carried by the line 21. The characteristics of those signals that will affect the receiver when tuned to that particular bandwidth and center frequency are then received from the memory by its output control logic 33. It is this data concerning the characteristics of the few signals to be generated that is used to control their generation.

In the circuits shown in FIG. 1, the capability is provided for generating two such signals at any one time. A first signal generator 35 has a companion modulating circuit 37 in series. The output of the circuits 37 is applied to a combiner circuit 39, this output being in accordance with the characteristics presented on a control bus 41 from the output of the control logic circuits 33. A second signal generator 43 is similarly provided with its accompanying modulating circuits 45 in series to the combining means 39. Additional signal generators and modulating circuits could be provided if more than two signals are desired to be simulated instantaneously simultaneous for any particular bandwidth at which the tuner within the receiver 17 is set. Similarly, if only one simulated signal is contemplated for any receiver bandwidth, then only one pair of the signal generator and its modulator need be provided. Alternative to this technique of providing a separate signal generator for each simultaneous signal to be simulated, a single signal generator can be utilized for multiple signals by using the same techniques as presently used in the prior art to simulate an entire spectrum of signals. The same disadvantages as described above with respect to this prior art technique apply to its use as part of this invention as well, except that with fewer signals to be generated at any one time, its limitations are not as severe.

Figure 2:
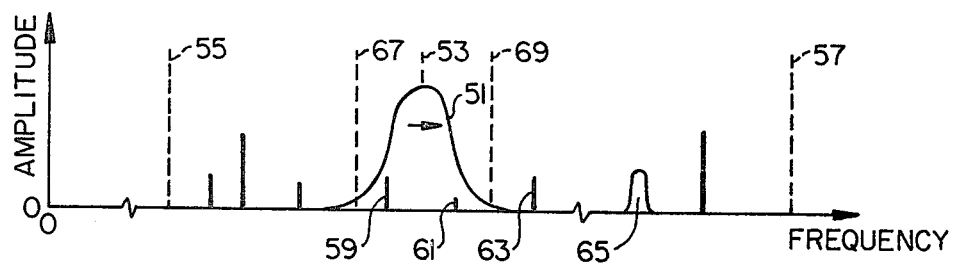
FIG. 2 is a frequency spectrum to illustrate the operation of the system of FIG. 1.

Referring to FIG. 2, the operation of the receiver with simulator (FIG. 1) may be described. A bandwidth response 51 of the tuner within the receiver 17 has a center frequency 53 that is movable back and forth along the full frequency range between a lower frequency extreme 55 and an upper frequency extreme 57. A plurality of signals within this frequency range are to be detected. Examples are signals 59, 61, 63 and 65. Although the "bandwidth" of the tuner is technically defined as the difference in frequency between its half power response points on the sides of the curve 51, it is desired to simulate the signals over a predetermined broader frequency range, such as between limits 67 and 69 of a frequency window. The limits 67 and 69 of this window are set so that all signals that affect the receiver when tuned to any particular center frequency 53 will be generated in the simulation.

The window 67–69 moves with the tuner center frequency 53, as designated in the line 51 (FIG. 1) is changed. This movement can be in discrete intervals or there can be a continuous sweep. If a continuous sweep, the window 67–69 may be made wider than normal so as to include simulated signals just as the tuner bandwidth 51 reaches it. This then allows simulation of any distortions that are present in the tuner when first tuning in simulated signal. Generally, the window 67–69 is made narrow to reduce the number of signals that need to be simulated at any one time. However, it must be made wide enough to provide a real live simulation in the receiver by including all that will affect the receiver.

Most tuners of the type being described, particularly those used in radar warning systems, require a finite period of time when changing from one frequency to another; that is, when a new center frequency is commanded by a new signal in the line 21. The simulating circuits also operate in response to that new tuner signal in the line 21 to generate the appropriate signals to be simulated that have frequencies within the window 67–69 at its new position. The signals within this window, such as the signals 59 and 61 of FIG. 2, preferably are generated by the system of FIG. 1 in less time than it takes for the tuner to change frequency. As a result, the technique of the present invention allows the entire frequency range 55–57 to be scanned and simulated signals observed as if the entire set of signals were simulated at the same time. Of course, only a very few of them are, such as one or two at any one time, which is a major advantage of the present invention.

In order to provide a realistic simulation, the system of FIG. 1 needs to have the ability to generate various types of signals. In the example of a radar warning receiver, radar emitters of many various types need to be simulated. The characteristics of each radar emitter within the frequency range 55–57 is recorded in the memory 29. This information includes the pulse width, pulse recurrence interval, simulation of the radar scan, simulation of gain patterns of both the emitter and receiver antennas, and a simulation of any relative motion between the emitter and receiver such as occurs if one or both are in vehicles. An additional characteristic, as shown with the pulse 55 of FIG. 2 is a frequency variation over time that may occur. Digital data within the memory 29 controls the signal generators 35 and 43 and the modulators 37 and 45 to simulate any such type of signal. The data only for those simulated signals within the window 67–69 at any instant is read out of the memory 29 and controls the signal generators and modulators. That portion of the data for a particular signal to be generated that specifies the pulse width, recurrence interval center frequency or frequency variation, is applied to the signal generator 35 or 43. The remaining characteristics of the pulse to be simulated are applied to the accompanying modulator circuits 37 or 45. The modulation that is superimposed by the modulators 37 and 45 upon the output of the accompanying signal generators 35 and 43 respectively, is generally in the nature of attenuation, and it may vary as a function of time to simulate antenna scan and relative motion between the emitter and the receiver antennas. Techniques and systems for simulating signals in this manner are well known. What is new in the technique of the present invention is the generation of only those signals which will affect the tuner at any particular instant.

In order to allow a rapid determination from all of the data in the memory 29 of the characteristics of the few signals to be simulated at any one time, the memory is preferably arranged with the memory location addresses corresponding to different frequencies throughout the full frequency range 55–57 (FIG. 2). With this system, the input control logic 31, in response to a center tuning frequency signal in the line 21, will address only those simulated signals within the window 67–69 for that particular tuner bandwidth center frequency 53. A memory data location is provided for every possible frequency in the range 55–57 wherein a signal may be desired to be simulated. Characteristic data is then loaded into the memory only in those locations corresponding to frequencies of the signals to be simulated. A flag bit is preferably included in each of these individual data locations to designate whether a signal is simulated at the frequency represented by that location.

The simulated signals, as previously mentioned, can either be inserted in the intermediate frequency portion of the receiver, as shown in FIG. 1, or can be inserted at the radio frequency input to the receiver in place of the antennas 11. Introducing the signal, as in FIG. 1, at the intermediate frequency stage, omits from a full simulation any distortions that may be generated by the down converter 13 to a signal received at its input. However, the technique of the present invention permits any such generated spurious signals to be included in the memory 29 as another simulated signal. These spurs are generally in the form of harmonics of a received signal. The existence and level of such harmonics can be determined by testing the receiver itself with the signals to be simulated, or from measured transfer function. The level and any other characteristics of the harmonic are then stored in the memory 29 at an address corresponding to its frequency. This technique provides a complete simulation when all of the receiver is not utilized.

As an alternative to the particular system shown in FIG. 1, the techniques of the present invention are also applicable to the situation where the receiver 17 does not tune the frequency range according to step instructions, but rather tunes across all or portions of the frequency range in accordance with a continuous sweep of known characteristics. Simulated tuning instructions are applied to the memory 29. These instructions are extrapolated from the known sweep characteristics of the receiver and its timing, without detailed step-by-step tuning instructions from a controller 19.

Although the various aspects of the present invention have been described with respect to a preferred embodiment thereof, it will be understood that the invention is entitled to protection within the full scope of the appended claims.

I claim:
1. In combination:
an electromagnetic wave receiver of the type having a tuner in which a selected defined bandwidth is tunable over a broader frequency range;
memory means for storing the characteristics and frequencies of a plurality of different signals to be simulated within said frequency range;
control logic means responsive to the selected tuner center frequency and bandwidth for extracting from said memory only and all of the simulated signals that exist within a frequency window that is a fraction of said frequency range, said window surrounding said selected tuner center frequency and bandwidth;
signal generating and modulating means responsive to said control logic means for generating only those simulated signals, if any, within said frequency window with their said characteristics and frequencies; and
combining means receiving said simulated signals from the means and delivering them ahead of said tuner.

2. The system according to claim 1 wherein said frequency window is limited in frequency bandwidth to include only those frequencies that affect said receiver when tuned to said selected center frequency and bandwidth.

3. The system according to claim 1 wherein said tuner is configured to select the frequencies of its bandwidth in response to a bandwidth selection command after a predetermined delay, and wherein said control logic means and said signal generating and modulating means are characterized by generating the simulated signals for the frequencies of that bandwidth in less time than said tuner delay.

4. In combination with an electromagnetic wave receiver of the type having a tuner in which a defined bandwidth is connected to be tuned over a broader frequency range in response to a bandwidth and center frequency selection signal, a system for simulating a selected plurality of all of the electromagnetic signals within said bandwidth from a larger plurality of such signals extending in frequency throughout said frequency range, comprising:
storage means for storing data of the characteristics of said larger plurality of electromagnetic signals to be simulated;
control logic means connected to be responsive to said bandwidth and center frequency selection signal for selecting from said storage means the characteristics of said selected plurality of simulated signals that exist within a tunable frequency window that includes only those frequencies that affect the receiver at its particular tuned frequencies with said defined bandwidth;
generating and modulating means responsive to said control logic means for generating and modulating only those simulated signals, if any, within said frequency window with their characteristics as stored, and combining means receiving the simulated signals from said generating and modulating means and connecting them ahead of said tuner.

5. The system according to claim 4 which additionally comprises:

means for producing and scanning said bandwidth selection signal from one end of said frequency range to the other;

said tuner is characterized by a predetermined delay in responding to said bandwidth selection signal to tune to different frequencies and bandwidths; and said control logic means and said generating and modulating means are characterized by generating the simulated signals for the designated new frequencies and bandwidth in response to said bandwidth selection signal in less time than said tuner delay.

6. The system according to claim 5 wherein said tuner is characterized by a predetermined delay in responding to said bandwidth selection signal to tune to different frequencies and bandwidths, and wherein said control logic means and said generating and modulating means are characterized by generating and modulating the simulated signals for the designated new frequencies and bandwidth in response to said bandwidth selection signal in less time than said tuner delay.

7. The system according to any claim 1 wherein said receiver is a radar signal identifying radio frequency receiver and said plurality of simulated electromagnetic signals are a plurality of simulated radar signals of various frequencies and signal characteristics.

8. For a radar signal identifying radio receiver of the type having a tuner in which a defined bandwidth is tunable over a broader frequency range and which in response to a command chosen from at least one of the class consisting of bandwidth and center frequency change command tunes in response to such command after a predetermined delay, a system for simulating a first plurality of radar signals within said bandwidth tuned by said tuner, selected from a second plurality of radar signals extending in frequency throughout said frequency range, comprising:

storage means for storing data of the characteristics of said second plurality of radar signals;

means responsive to said command for identifying the characteristics of said first plurality of the simulated signals in said storage means that exist within a predetermined frequency window that includes said tuner bandwidth and center frequency and is at least equal to said bandwidth, said window being a fraction of said frequency range, generating and modulating means responsive to said storage means for creating only that first plurality of simulated signals, if any, within said frequency window with their characteristics as stored in said storage means, said signals being created, when the bandwidth and center frequency is changed, in less time than said predetermined tuner delay, and combining means receiving said simulated signals from said generating and modulating means for delivering them ahead of said tuner.

9. The system according to claim 8 wherein said combining means delivers said simulated radar signals to an intermediate frequency stage of said receiver, and wherein the said storage means stores characteristics of spurious signals that would normally be generated in a front end section of said receiver.

10. The system according claim 3 wherein said tuner is configured to select the frequencies of its bandwidth in response to a bandwidth selection command after a predetermined delay, and wherein said control logic means and said signal generating means are characterized by generating the simulated signals for the frequencies of that bandwidth in less time than said tuner delay.

11. The system according to claim 3 wherein said receiver is a radar signal identifying radio frequency receiver and said plurality of simulated electromagnetic signals are a plurality of simulated radar signals of various frequencies and signal characteristics.

12. The system addording to claim 5 wherein said receiver is a radar signal identifying radio frequency receiver and said plurality of simulated electromagnetic signals are a plurality of simulated radar signals of various frequencies and signal characteristics.

13. The system according to claim 6 wherein said receiver is a radar signal identifying radio frequency receiver and said plurality of simulated electromagnetic signals are a plurality of simulated radar signals of various frequencies and signal characteristics.

* * * * *